(12) United States Patent
Urup (10) Patent No.: US 11,122,783 B2
(45) Date of Patent: Sep. 21, 2021

(54) MOVABLE PARTITION WALL

(71) Applicant: VEOLIA WATER SOLUTIONS & TECHNOLOGIES SUPPORT, SAS, Saint Maurice (FR)

(72) Inventor: Bent Urup, Fredericia (DK)

(73) Assignee: VEOLIA WATER SOLUTIONS & TECHNOLOGIES SUPPORT, SAS, Saint Maurice (FR)

( * ) Notice: Subject to any disclaimer, the term of this patent is extended or adjusted under 35 U.S.C. 154(b) by 184 days.

(21) Appl. No.: 16/322,260

(22) PCT Filed: Aug. 2, 2017

(86) PCT No.: PCT/DK2017/050257
§ 371 (c)(1),
(2) Date: Jan. 31, 2019

(87) PCT Pub. No.: WO2018/033189
PCT Pub. Date: Feb. 22, 2018

(65) Prior Publication Data
US 2019/0191673 A1    Jun. 27, 2019

(30) Foreign Application Priority Data

Aug. 19, 2016  (DK) .......................... PA 2016 00485
Mar. 21, 2017  (DK) .......................... PA 2017 70199

(51) Int. Cl.
*A01K 63/00*    (2017.01)
*A01K 61/10*    (2017.01)
(Continued)

(52) U.S. Cl.
CPC ............ *A01K 63/006* (2013.01); *A01K 61/10* (2017.01); *A01K 63/04* (2013.01); *A01K 63/10* (2017.01); *Y02A 40/81* (2018.01)

(58) Field of Classification Search
CPC ........ A01K 61/60; A01K 61/10; A01K 61/54; A01K 61/75; A01K 71/00; Y02A 40/826;
(Continued)

(56) References Cited

U.S. PATENT DOCUMENTS 4,003,337 A    1/1977    Moore
5,353,745 A *  10/1994   Fahs, II ............... A01K 63/003
                                                           119/226
(Continued)

FOREIGN PATENT DOCUMENTS

CN    203407356 U    1/2014
CN    203407357 U    1/2014
(Continued)

*Primary Examiner* — Peter M Poon
*Assistant Examiner* — Jeffrey R Larsen
(74) *Attorney, Agent, or Firm* — Birch, Stewart, Kolasch & Birch, LLP (57) ABSTRACT

A device (1) for separating segments (2) in a tank. The tank system includes a circular tank system with water flow for the farming of fish, said device being movable and comprising a plurality of preferably two element units, which are joined so as to form a V-shape seen from above. Further, the invention comprises the use of the device for the farming of edible fish.

11 Claims, 8 Drawing Sheets

(51) Int. Cl.
*A01K 63/04* (2006.01)
*A01K 63/10* (2017.01)

(58) Field of Classification Search
CPC .............. Y02A 40/81; C02F 2103/20; C02F
2103/007; C02F 3/06; C02F 1/004; C02F
2301/046; C02F 2303/24; C02F 3/322
USPC ................................ 119/211, 223, 226, 215
See application file for complete search history.

(56) References Cited

U.S. PATENT DOCUMENTS

| | | | | |
|---|---|---|---|---|
| 5,816,196 | A * | 10/1998 | Webster | A01K 61/90 |
| | | | | 119/228 |
| 6,588,370 | B1 * | 7/2003 | Odeh | E02B 8/085 |
| | | | | 119/219 |
| 2015/0250149 | A1 | 9/2015 | Gronkowski | |
| 2016/0113251 | A1 * | 4/2016 | Urup | A01K 63/006 |
| | | | | 119/216 |

FOREIGN PATENT DOCUMENTS

| | | |
|---|---|---|
| DE | 28 29 496 A | 1/1980 |
| EP | 1 763 995 A1 | 3/2007 |
| RU | 2022097 C1 | 10/1994 |
| WO | WO 99/41976 A2 | 8/1999 |
| WO | WO 2014/183765 A1 | 11/2014 |
| WO | WO 2014/198556 A1 | 12/2014 |

\* cited by examiner

MOVABLE PARTITION WALL

The invention relates to a movable partition wall for separating segments in vessels with water flow for the farming of fish. The invention moreover relates to the use of the device.

WO patent document PCT/DK2014/000022 discloses a device for separating segments in a vessel for the farming of fish. However, it has been found that this prior art involves some drawbacks, including that the water flow and e.g. dead fish in the vessel affect the partition wall with a relatively great force, which easily causes damage and thereby initiates repairs resulting in production-operation stoppages and costs. The WO document thus shows a concept where a fish farming system consists of one or more concentric vessels, where each of the vessels is divided into several sections, with an approximate laminar flow through the sections in a direction along the vessel structure itself. The water thus flows through the transverse section separations of the vessel, as they are constructed as permeable walls which disturb the flow as little as possible.

Potentially, the concept of the movable partition wall may also be applied to the division of tanks in fish farming systems constructed with traditional raceways, where the vessels have rectilinear parallel walls, and where a mobile division of the vessels into several sections might be desired.

Thus, the prior art of movable division of tanks into sections for fish farming consists of a single partition segment in a single plane, arranged approximately perpendicularly to the direction of flow in the fish vessel, where a plane rectangular net or a permeable wall made in the form of a net structure or by using lattice bars covers the cross-section of the vessel.

To make these partition walls movable, the prior art uses a system where the permeable partition wall is suspended from rollers running in a path on each side of the vessel, cf. the RAS2020 concept, as stated in PCT/DK2014/000022, which publication is hereby adopted in its entirety by reference in this specification.

Alternatively, the wall of the section may run on rollers on the bottom.

Irrespectively, the basic starting point is that the wall must be movable in parallel with the flow direction of the water, so that the individual tank section may be enlarged or reduced in size, in order to adapt the volume in the individual vessel section to the actual amount of fish in it.

To move fish from one section to the next one without pumping, an opening/a door will basically be arranged in the partition wall, which may be opened or closed so that the fish may swim from one section into the next one, optionally induced by the fish density being increased in the section from which the fish is to moved, by reducing the distance between the two partition walls at the inlet and outlet ends of the vessel section.

To make the walls fit tightly with the vertical vessel side, considering that the vessel width may typically vary, these known partition walls may either be provided with a wing outermost, which may be moved out to the side at a variable angle, thereby causing the total width of the partition wall to be flexible to a certain degree, and the total width of the wall will therefore adapt itself to the variation in the width of the individual vessel section.

As an alternative to this wing, the wall may be divided into two or more parts which will overlap to a small degree, so that, by parallel displacement, these walls will have an overall variation possibility in width, such that, together, the parts may cover the total cross-section of the vessel, even if this varies in width.

The drawbacks of the existing art are partly the costs of the installation, since it requires a complicated suspension system all the way round in the vessel for the transverse walls to be movable, and partly the forces from the water and particularly from dead fish. If fish mortality occurs in the vessel, these forces are rather violent, particularly in case of a large vessel width, where the bearing structure in the partition wall will be subjected to a strong moment, with a maximum moment on the partition wall centrally on the vessel.

It may be difficult to install an effective collector of dead fish in combination with the existing technology.

Accordingly, an object of the invention is to provide a movable partition wall without the above-mentioned drawbacks.

The object of the invention is achieved by a movable partition wall of the type stated in the introductory portion of claim 1, which is characterized in that the partition wall comprises wall units which are joined so as to form a V-shape seen from above.

Hereby, it is possible to reduce the forces acting on the device, resulting in significantly reduced costs of repair and operation stoppages.

Other expedient embodiments of the device are defined in claims 2 to 8.

As mentioned, the invention also relates to the use of the device for the farming of edible fish.

It is hereby possible to farm edible fish more quickly and at lower costs than has been possible in the past.

Thus, the invention relates to a mobile partition wall or partition segment for fish vessel sectioning. The invention comprises a device in the form of a partition wall specifically for use for dividing fish tanks or fish vessels into several individual sections where mobile division is needed. It is noted that the V-shaped configuration of the partition wall also gives advantages in case of fixed installations, e.g. easier collection of dead fish and less moment on the partition wall, and thereby the possibility of making it lighter and less expensive.

Below, the invention will be called partition segment as well as partition lattice or partition wall depending on the context.

The invention will be explained more fully with reference to the figures of the drawing.

Below, the term "vessel" is used for a liquid container, in which fish or another animal aquatic culture is farmed. Other terms used for such a unit are aquarium, tank, fish tank, tank system, container, pond farming pond, pond, marine farm structure or similar terms, all of which are synonyms for a water-filled area which is defined against the surroundings in one way or another, and in which it is attempted to maintain growth conditions for the aquatic culture. In the document, "vessel" refers to a land-based water-filled enclosure with a freely accessible water surface.

Figure 1:
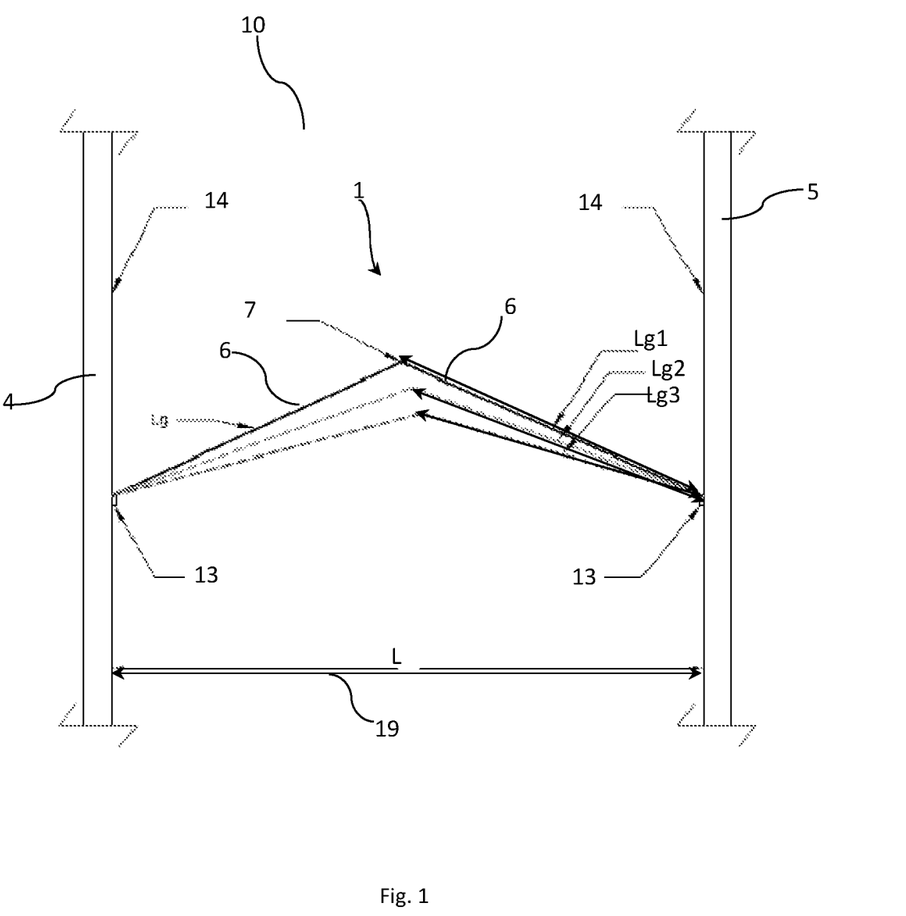
FIG. 1 shows 3 sets of different embodiments of movable partition walls shown schematically seen from above and corresponding to detail A from FIG. 2.
Figure 2:
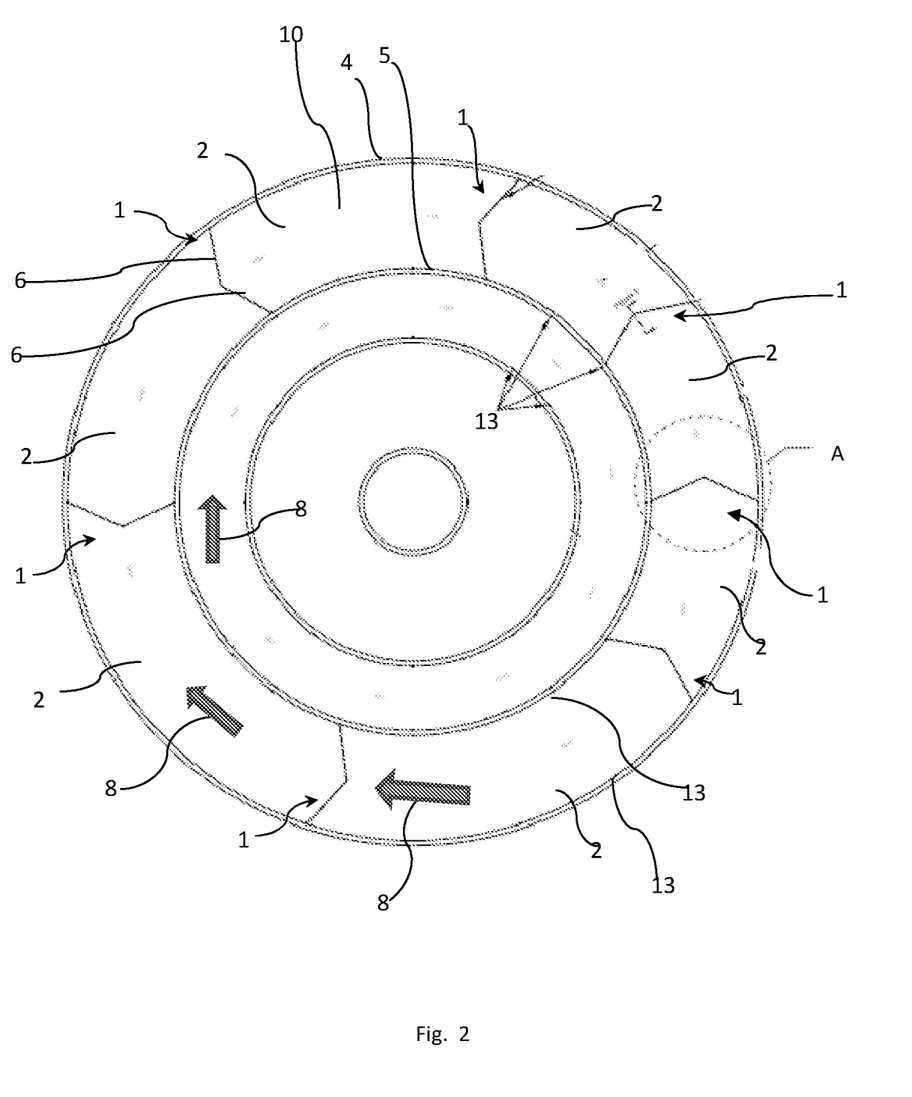
FIG. 2 shows a tank system seen from above with a vessel, in which a plurality of movable partition walls is installed for dividing the vessel into tank segments.

FIG. 1 shows the partition segment or the movable partition wall 1 in plan view seen from above, a section corresponding to detail A in FIG. 2 being shown in enlarged view. The partition wall 1 consists of two hinged/angled permeable faces 6, and, as shown, they are arranged in a vessel 10, also called fish tank, and they are mounted with the two faces in a vertical position. The two permeable faces are also called wall units 6 below. The two wall units 6 must each have a height such that they extend from the bottom 12 of the vessel 10 and somewhat above the operational water level 18 (see FIG. 3), so that the fish is kept safely separated on each side of the movable partition wall 1.

The width of each of the two wall units 6 must exceed half the width of the vessel 10, called "L" below, and the width of each of the two wall units 6 should be between 0.55 and 0.7 times the vessel width and not below 0.515 times the vessel width.

The width "lg" of a single wall unit 6 is indicated by arrows in FIG. 1, called Lg1, Lg2 and Lg3, where Lg1 has a length 0.7×L. Correspondingly, wall units Lg2 and Lg3 corresponding to a width factor of 0.55 or 0.515 times L are shown in dashed line and indicated by arrows called Lg2 and Lg3. The dashed line indicates that the wall units Lg2 and Lg3 are not realized simultaneously with the wall unit Lg1, but are alternatives thereto. The greater the width Lg of the individual wall unit 6 is, the smaller the moment/load on the structure, and the more effective the dead fish collector is, but the greater the width Lg is, the greater the water resistance caused by the partition lattice or the movable partition wall 1. The arrow 19 indicates the vessel width L from the inner side 14 of the side wall 4 to the opposite inner side 14 of the side wall 5, and this arrow 19 follows the same horizontal plane as the lengths Lg1, Lg2 and Lg3 are measured in. In the example shown, the walls 4, 5 of the vessel are vertical, and L, Lg1, Lg2 and Lg3 will be independent of the selection of horizontal plane, but this will not be the case for vessels with non-vertical walls.

In FIG. 1, the partition lattice or the movable partition wall 1 is shown with the two halves which the wall units 6 form of the V-shape of the same width, but it is possible to differ from this symmetry, so that one part of the partition lattice is larger than the other. However, normally, no advantage is involved by making the one part larger than the other, since this may result in differences in the load against the two side walls in the vessel.

Figure 6:
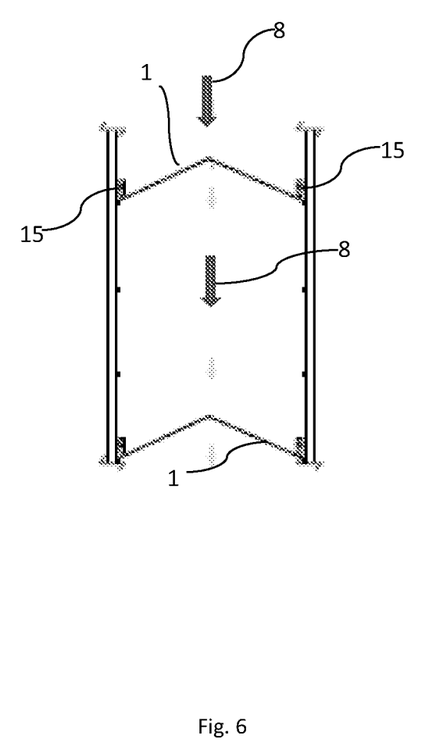
FIG. 6 shows an embodiment of the invention, where the vessel has rectilinear parallel walls 4, 5, FIG. 7, at the top, shows a hinged folding wall seen from above, in the centre, an exploded representation of the 3 parts of the wall seen from the front, and, at the bottom, the same exploded representation seen from the opposite side.

Usually, the side walls 4, 5 of the vessel 10 are vertical, but curved or non-vertical side walls may occur, and, then, the width L of the vessel 10 and of the two halves of the partition lattice is determined in a given horizontal plane, where the width of the vessel is defined as the shortest path between two inner sides 14 in this horizontal plane, and the partition lattice width L associated therewith is determined in the same horizontal plane. FIG. 1 shows a vessel 10 comprising outer walls 4 and inner walls 5 which are circular and arranged as concentric circles, so that the annular area defined by them constitutes the vessel 10. FIG. 6 shows a section of a vessel which is linear, and, here, the walls 4, 5 will be rectilinear and parallel.

Figure 3:
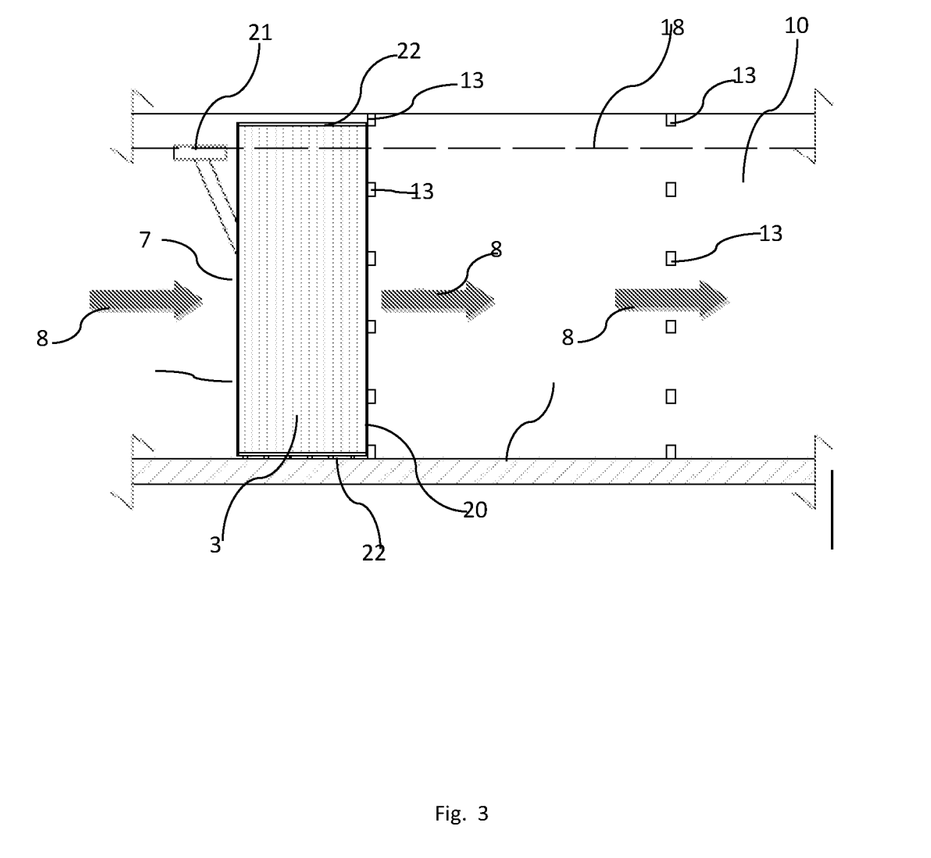
FIG. 3 is a schematic side view of one wall unit seen inwards toward a tank side.
Figure 4:
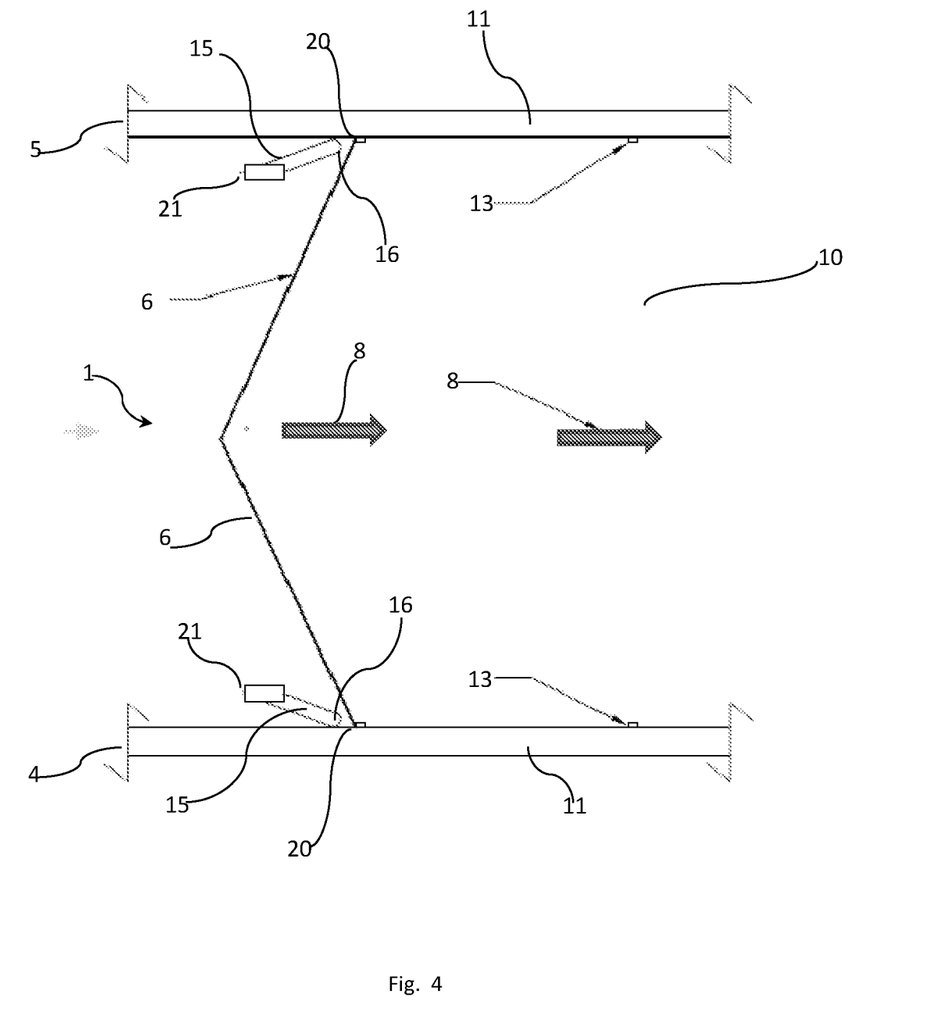
FIG. 4 is a schematic representation of a partition wall corresponding to detail A in FIG. 2, in which pipes for discharging dead fish are included.

The faces or the wall units 6 are erected and mounted together at a hinged angle, so that the angle, formed where the two faces or wall units 6 of the partition lattice or the movable partition wall 1 are hinged, is positioned near the centre line of the vessel between the two vessel inner sides 14, so that the hinged joint extends approximately vertically from the bottom 12 of the vessel 10 and vertically upwards. With the angle seen from a plane section from above, pointing forwards against the water flow, as indicated in FIGS. 2, 3 and 4 with flow arrows 8.

The two vertical rear edges 20 formed by the two wall units 6 of the angle, support against the sides 14 of the vessel, where they engage blocking elements 13 in the form of mounted brackets 13, which may alternatively be in the nature of mounted blocks or strips, so that the partition wall 1 presses out against the tank side 14, where the brackets 13 will be mounted behind the partition wall 1 seen relative to the flow direction 8 of the water and thereby be seated at the downstream side. Hereby, these brackets 13 will prevent the partition wall 1 from sliding rearwards with the water flow, and, instead, they ensure that the lattice and the partition wall will maintain their positions in the vessel 10. This is especially visible in FIG. 3.

The actual faces of the wall units 6 may consist of a bearing frame 22, where the selection of material is not decisive, it may e.g. be of GRP, composite, PE, PVC, SS. The frame 22 or the bearing structure of the face 6 need not be permeable per se. Permeability, on the other hand, is a significant property of the predominant part of the area of the actual field in the two wall units 6 which form the two hinged parts of the partition wall 1.

The two faces 6 may be coated with a net structure, which ensures great water flowability, but is simultaneously sufficiently fine-meshed to ensure that the fish present in the surrounding tank sections cannot get from one side of the partition wall 1 to the other.

To minimize the water resistance and ensure better flow, vertical or horizontal lamellae configured to minimize water resistance may be used as an alternative to a net structure. Here, a surrounding frame structure may optionally be omitted, and the lamellae may be self-supporting instead.

As will be seen in FIG. 4, suction ends 16 and associated pipes 15 for collecting dead fish are mounted in the corners toward the vessel wall 14, near the bottom 12 of the vessel 10. The pipes 15 are e.g. connected with a pump or an air lift system (not shown) for picking up dead fish and other matter that might be concentrated in front of the partition walls 1 in these corners, and which might have a size such that it cannot pass through the lamellae or the net structure in the partition wall. The circumstance that these partition segments or lattices are passively able to concentrate dead fish in a small area in front of or upstream relative to the partition wall 1, is an important property of this type of partition lattices. A collection unit 21 for fish and other pumped material is mounted on top of the pipe 15, and since this unit is located close to the upper edge 11 of the vessel, it will be easy to empty it of collected material. The collection unit 21 may e.g. be formed by a net bag, which is easy to pick up and empty, so that collected material does not stay long in the vessel.

To facilitate the movement from one position to another, wheels may be mounted below the partition wall 1 at the bottom 9 thereof. Normally, spacer blocks or wheels will be mounted between the frame 22 of the wall units 6 and the bottom 12 of the vessel 10, which, in addition to minimizing friction at movement, will also be instrumental in ensuring that organic material will not be concentrated in front of the partition wall at the bottom 12.

The invention enables simple installation of dead fish collectors at the outlet end of the individual vessel sections 2. At the same time, it is basically a considerably simpler and less expensive installation than already known movable partition walls.

The fact that the partition walls 1 consist of two vertical planes hinged together with joints via a hinge system 7 in a vertical line near the centre line of the vessel, so that, seen from a horizontal plane, the two planes form an angle up against the flow direction of the water, means that the pressure from water flow and any dead fish will apply a moment to the structure to a less extent in the flow direction, where the forces will instead mostly propagate along the two planes and further in a pressure out against the walls of the vessel, against the blocking blocks 13 or positioning blocks or strips mounted on the wall of the vessel.

Depending on the length of the sides and thereby the angle at which the partition wall presses out against the tank wall, the maximum moment transversely to the walls may be reduced very considerably, potentially to below 20% of the moment that will be applied to a partition wall of an earlier design.

Rather than just settling on the cloth or lamellae of the partition wall, caused by the pressure of the water, dead fish will be driven to a higher degree by the water flow along the individual wall element 6 because of its angling relative to the flow and be carried out into the periphery toward the internal side wall 14 of the tank. Here, they drop down on the bottom and may easily be removed in the angle between partition wall 1, tank side 14 and tank bottom 12, optionally using well known air lift technology. Dead fish collectors 21 may easily be installed permanently on the wall units 6 upstream and be moved together with the partition wall 1, when this is moved to a new position in the vessel 10.

The dimensions of the partition wall structure may be reduced significantly, so that it may be built of a thinner material. The reason is the much smaller moment which will be applied to the structure, and the pressure of the water causes the wall to be kept in position, and the angle formed by the two wall elements 6 with each other will be kept in position inwards toward blocking elements 13 on the firm sides 14 of the vessel. After movement of the partition wall 1, it is recommended to attach or secure the partition wall 1, so that there is no risk of it being moved unintentionally in operation.

Figure 5:
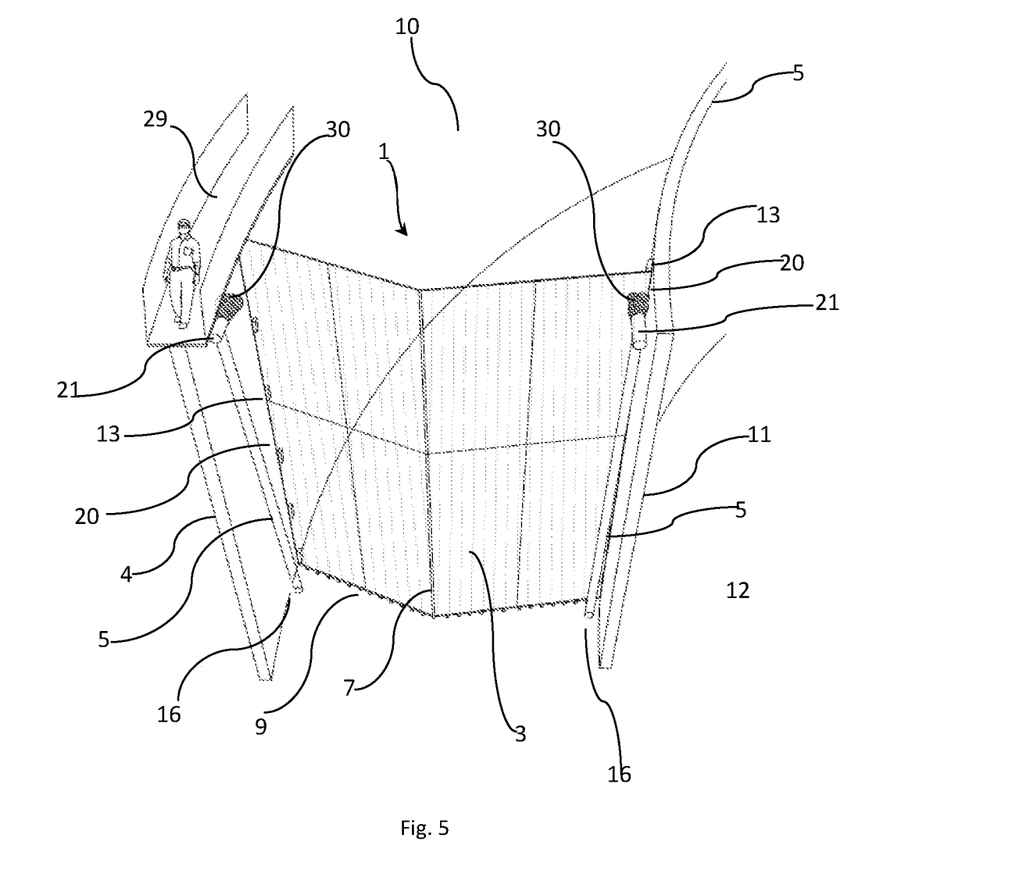
FIG. 5 shows a 3*d* representation of a tank section with associated partition wall.

It is not necessary with a complicated suspension system, since the blocking elements may be made of simple resistance blocks or vertical strips in the side of the vessel which can easily keep the partition wall in position. It is noted that the blocking elements 13 in round vessels will be arranged radially opposite each other, so that a blocking element 13 on e.g. the inner wall 5 in FIG. 5 is seated at a tangent to the wall, and, correspondingly, a blocking element at the inner side of the outer wall 4 will be seated at a tangent to this wall face, and the two tangents will then be parallel. But even if there should be some displacement of the inner set of blocking elements 13 shown on the wall 5 relative to the outer set of blocking elements 13 shown on the wall 4, the two partition wall segments 6, because of their mutual hinging and because of the fact that they are slightly wider than half of the distance between the one wall 5 and the opposite wall 4, may nevertheless be mounted readily and ensure that fish do not swim from one tank section into the other.

In the example shown FIG. 1, 20 sets of blocking elements 13 are used in the inner vessel as well as the outer vessel, and these are mounted with the same angular spacing along the circumference. But it is possible to insert additional blocking elements relative to the requirements of use of the individual vessel, thereby providing for the possibility of a finer division, optionally only along part of the circumference. The blocking elements shown may be plastics blocks bolted to the vessel walls, and, as will be seen in FIG. 3, this embodiment involves 6 individual blocks which are seated evenly distributed along a vertical line along the vessel wall 14. In an embodiment not shown, the blocking elements may also be formed by notches or projections, which are embedded in the vessel wall during its manufacture. If notches in the wall are involved, the vertical rear edge 20 must be provided with projections fitting the notches. The advantage of such an embodiment is that the blocking elements will not appear as projections in the walls of the vessel with which the fish are liable to collide and thereby incur damage in their scale layer. Notches in the walls might also give rise to a lower flow resistance than projections. At the same time, notches in the walls will not constitute an obstacle to the movement of a partition wall along an internal face 14 of a side wall 4, 5, as, during movement, the partition wall may here be pulled right up to the face 14 of the side wall without having to be passed round projecting blocking elements. A further possibility of establishing blocking elements is that these comprise step-like straps (not shown), which are inserted into the vessel wall at a suitable time during its hardening. In principle, this may be done at in-situ casting of a complete or parts of a vessel wall as well as during factory production of vessel concrete elements, which are subsequently transported to and assembled where the vessel is to be established.

The structure comprises an indirect opening or passage for the movement of fish from one section to an adjacent section, as the partition wall may merely be pushed slightly inwards toward the centre of vessel and out from the internal side wall 14 from one side, whereby the fish may pass behind or in front of the partition wall 1.

Finally, it should be mentioned that the two wall units 6 may easily be folded completely together via the hinge system 7, and in the state folded together the partition wall 1 only constitutes a small part of the resistance to movement in the water which the partition wall folded out constitutes. Thus, it is possible to pull the two wall units 6 of a partition wall inwards toward the innermost one or the outermost one of the walls in a circular annular vessel, as shown e.g. in FIG. 1, and here the partition wall folded together may be pulled forwards to a new position with a relatively small flow resistance also in the counterflow direction. Such a movement is indicated sketch-wise seen from above in FIG. 9. This figure shows 3 operators 23 moving a partition wall 17 folded together, as an operator, with an instrument, such as a rod 24 with e.g. a boathook (not shown) at one end, hooks the hinge pin 25 of the hinge or an eye (not shown) welded to the wall elements in this area. To facilitate engagement with e.g. a boathook, a plurality of additional eyes 26 are provided on each wall unit 6 of the movable partition wall 1. Since the eyes 26 are also provided along horizontal reinforcement beams 28 further down the partition wall 1 toward the bottom and not just at the top, the partition wall 1 may easily be handled with a large number of boathooks, or optionally with ropes tied to the eyes 26.

FIG. 5 shows an operator 23 walking on a footbridge 29 located on an upper edge of a vessel 10, and also shows the collection bag 30, which may be coupled to the collection unit 21.

Adjustments of the mutual dimensions of the vessel segments 2 in a large system, like the one shown in FIG. 2, may hereby be made manually and yet quickly, and without stressing or disturbing the occupiers of the vessel, such as e.g. fish.

Figure 7:
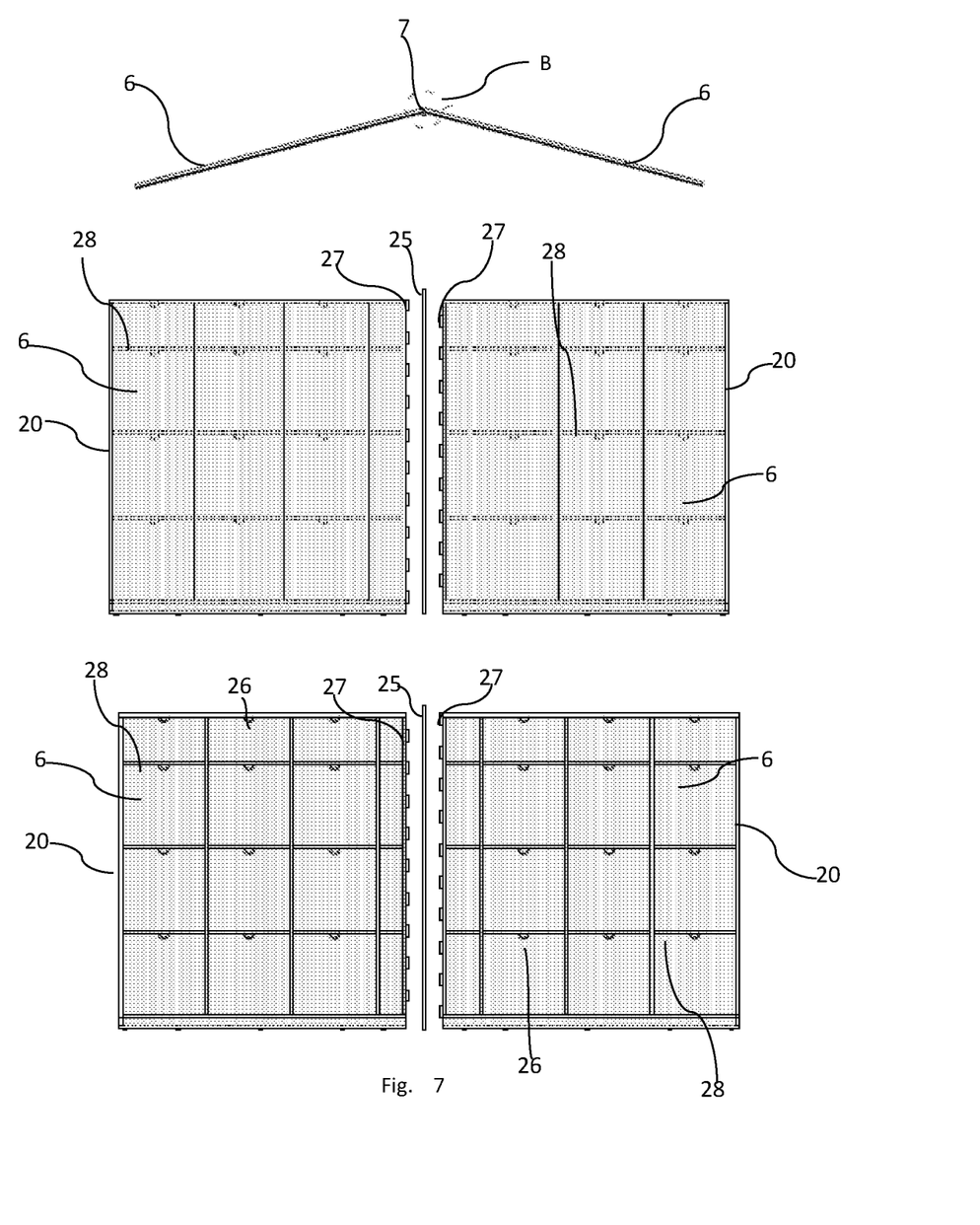
Figure 8:
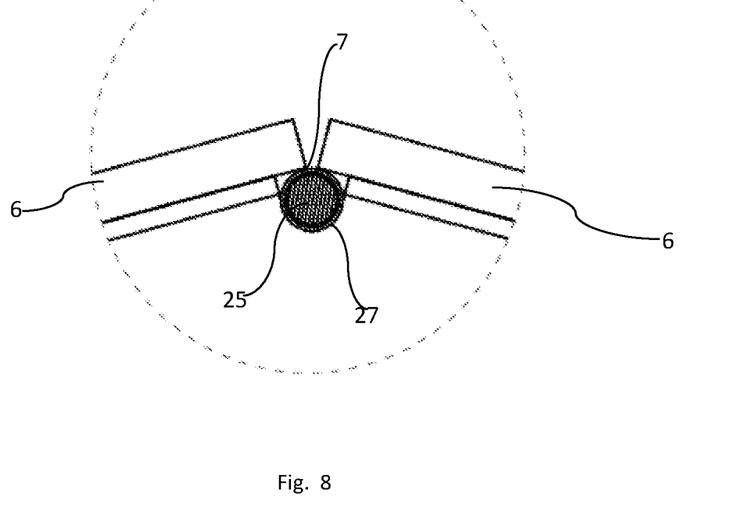
FIG. 8 shows a detail B from FIG. 7 in enlarged representation.
Figure 9:
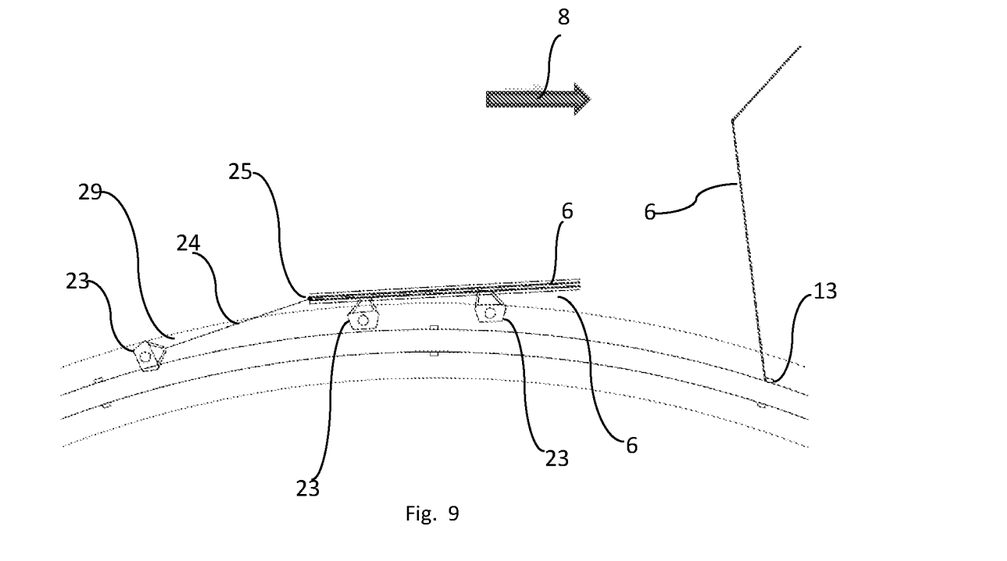
FIG. 9 is a sketch of a partition wall in a state folded together during movement in a vessel.

An enlarged section of the hinge system 7, corresponding to detail B in FIG. 7, is shown in FIG. 8, and it will be seen here how a through hinge pin or hinge shaft 25 is passed through hinge bearings 27 alternately associated with the one and the other of the two wall sections, said hinge bearings being configured as pieces of pipe welded to an outer frame 22 of the wall section concerned, which is clear in FIG. 7. As will be seen in FIG. 8, the individual hinge bearings 27 are arranged on the downstream side of the frame element, so that the two wall units 6 may be folded completely together to a parallel position side by side, as shown in FIG. 9. The position of the hinge system at the downstream side prevents the walls from closing together in the opposite direction, i.e. in the upstream direction, thereby ensuring additional stability. The frame 22 of the wall units 6, which also comprises the vertical rear edges 20, may e.g. be made of iron or a suitable corrosion resistant steel alloy, and, thus, the hinge bearings 27 may be welded easily thereto.

When the hinge system 7 is to be assembled, and the two wall units are hereby assembled pivotally to each other, the hinge bearings in the one wall unit are first aligned with the hinge bearings in the other wall unit, e.g. while both are on the ground, e.g. on top of each other in the position folded together. Then the hinge pin is introduced so that it passes through all hinge bearings.

REFERENCE NUMERALS

1 Movable partition wall
2 Vessel segments
3 Lattice or lamellae structure
4 A side wall
5 Opposite side wall
6 Wall units
7 Hinge system
8 Arrow indicating the water flow direction
9 Bottom of movable partition wall
10 Vessel
11 Upper edge of vessel
12 Bottom of vessel
13 Blocking elements
14 Internal face of side walls
15 Pipe for collecting dead fish
16 Suction end
17 Partition wall folded together
18 Indication of operational water level
19 Arrow indication of vessel width
20 Vertical rear edges
21 Collection unit
22 Frame
23 Operators
24 Pin
25 Hinge pin
26 Eyes
27 Hinge bearing
28 Horizontal reinforcement beams
29 Footbridge
30 Collection bag

The invention claimed is:

1. A movable partition wall for separating segments in a vessel with water flow for the farming of fish and a free water surface, the movable partition wall comprising:
   a lattice or lamellae structure for the flow of water and for ensuring that fish or other animals in the vessel cannot pass through the lattice or lamellae structure, wherein
   the partition wall is adapted to be inserted into the vessel such that it extends vertically downwards in the water at least from the water surface and to a bottom of the vessel and closes an area from a side wall to an opposite side wall of the vessel,
   the movable partition wall includes two wall units which are joined to each other so as to form a V-shape seen from above, the joined wall units are configured to be arranged in the vessel so that the tip of the V-shape points against the water flow direction, and
   each wall unit is configured to be fixed to the vessel by engagement with blocking elements at an internal side of the side wall and an internal side of the opposite side wall of the vessel so that when the movable partition wall is in use in the vessel the pressure of the water flow causes the wall units of the partition wall to press against the blocking elements.

2. A movable partition wall according to claim 1, wherein the wall units are joined to each other using a hinge system.

3. A movable partition wall according to claim 1, wherein each of the two wall units is plane and has a rear edge, and that the width of each wall unit exceeds the shortest horizontal distance from the one side wall to the opposite side wall of the vessel at a given height above the bottom by a factor of between 0.55 and 0.7 and not less than a factor of 0.515, the width of a plane wall unit being measured from the rear edge to the vertex of the V-shape in the plane of the wall unit and along a horizontal generatrix at the given height.

4. A movable partition wall according to claim 1, wherein the partition wall is provided with wheels at the bottom of the partition wall to facilitate movement.

5. A movable partition wall according to claim 1, wherein the movable partition wall is provided with a pipe for collecting and separating dead fish.

6. A movable partition wall according to claim 5, wherein the pipe has a suction end arranged where the movable partition wall adjoins a side wall in the vessel and on the upstream side of the partition wall.

7. A vessel for farming of edible fish comprising:
   a movable partition wall for separating segments in the vessel with water flow for the farming of fish and a free water surface, the movable partition wall comprising:
   a lattice or lamellae structure for the flow of water and for ensuring that fish or other animals in the vessel cannot pass through the lattice or lamellae structure, wherein
   the partition wall is adapted to be inserted into the vessel such that it extends vertically downwards in the water at least from the water surface and to a bottom of the vessel and closes an area from a side wall to an opposite side wall of the vessel,
   the movable partition wall includes two wall units which are joined to each other so as to form a V-shape seen from above, the joined wall units are configured to be arranged in the vessel so that the tip of the V-shape points against the water flow direction, and
   each wall unit is configured to be fixed to the vessel by engagement with blocking elements at an internal side of the side wall and an internal side of the opposite side wall of the vessel so that when the movable partition wall is in use in the vessel the pressure of the water flow causes the wall units of the partition wall to press against the blocking elements.

8. A movable partition wall according to claim 2, wherein each of the two wall units is plane, and that the width of each wall unit exceeds the shortest horizontal distance from the one side wall to the opposite side wall of the vessel at a given height above the bottom by a factor of between 0.55 and 0.7 and not less than a factor of 0.515, the width of a plane wall unit being measured from the engagement of the wall unit with a side wall to the vertex of the V-shape in the plane of the wall unit and along a horizontal generatrix at the given height.

9. A movable partition wall according to claim 2, wherein the partition wall is provided with wheels at the bottom of the partition wall to facilitate movement.

10. A movable partition wall according to claim 3, wherein the partition wall is provided with wheels at the bottom of the partition wall to facilitate movement.

11. A movable partition wall according to claim 2, wherein the movable partition wall is provided with a pipe for collecting and separating dead fish.

* * * * *